US012109641B2

(12) United States Patent
Luo et al.

(10) Patent No.: US 12,109,641 B2
(45) Date of Patent: Oct. 8, 2024

(54) OPTICAL DEVICE HAVING STRUCTURAL AND REFRACTIVE INDEX GRADATION, AND METHOD OF FABRICATING THE SAME

(71) Applicant: Applied Materials, Inc., Santa Clara, CA (US)

(72) Inventors: Kang Luo, Santa Clara, CA (US); Ludovic Godet, Sunnyvale, CA (US); Daihua Zhang, Los Altos, CA (US); Nai-Wen Pi, Santa Clara, CA (US); Jinrui Guo, San Jose, CA (US); Rami Hourani, Santa Clara, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 433 days.

(21) Appl. No.: 17/455,288

(22) Filed: Nov. 17, 2021

(65) Prior Publication Data

US 2022/0152724 A1  May 19, 2022

Related U.S. Application Data

(60) Provisional application No. 63/114,919, filed on Nov. 17, 2020.

(51) Int. Cl.
*B23K 10/00* (2006.01)
*F21V 8/00* (2006.01)

(52) U.S. Cl.
CPC ............ *B23K 10/00* (2013.01); *G02B 6/0016* (2013.01); *G02B 6/0036* (2013.01)

(58) Field of Classification Search
CPC .... B23K 10/00; G02B 6/0016; G02B 6/0036; G02B 6/0065; G02B 27/0172
See application file for complete search history.

(56) References Cited

U.S. PATENT DOCUMENTS 5,734,143 A * 3/1998 Kawase ............ H01J 37/32229
219/121.41
9,329,325 B2 * 5/2016 Simmonds ............ G02B 6/0061
(Continued)

FOREIGN PATENT DOCUMENTS

DE    102013220841 A1 *  4/2015  ......... C23C 18/2006
JP    2005246667 A   *  9/2005
(Continued)

OTHER PUBLICATIONS

Jeong et. al., "Etching materials with an atmospheric-pressure plasma jet" Plasma Sources Sci. Technol. 7, 1998, pp. 282-285 (Year: 1998).*

(Continued)

*Primary Examiner* — Jeffrey T Carley
*Assistant Examiner* — Jose K Abraham
(74) *Attorney, Agent, or Firm* — Patterson + Sheridan, LLP

(57) ABSTRACT

The present disclosure generally relates to a method and apparatus for forming a substrate having a graduated refractive index. A method of forming a waveguide structure includes expelling plasma from an applicator having a head toward a plurality of grating structures formed on a substrate. The plasma is formed in the head at atmospheric pressure. The method further includes changing a depth of the plurality of grating structures with the plasma by removing grating material from the plurality of grating structures.

25 Claims, 8 Drawing Sheets

(56) References Cited

U.S. PATENT DOCUMENTS

| | | | |
|---|---|---|---|
| 10,442,727 B2* | 10/2019 | Melli | C03C 15/00 |
| 10,935,730 B1* | 3/2021 | Lou | G02B 27/0172 |
| 10,955,606 B2 | 3/2021 | Young et al. | |
| 2003/0210880 A1* | 11/2003 | Johnson | C23C 16/401 |
| | | | 385/129 |
| 2010/0078320 A1 | 4/2010 | Stowell | |
| 2011/0151270 A1* | 6/2011 | Rockstroh | C23C 4/134 |
| | | | 427/446 |
| 2012/0009724 A1 | 1/2012 | Myong | |
| 2012/0261391 A1* | 10/2012 | Ihde | H05H 1/42 |
| | | | 219/121.52 |
| 2017/0315346 A1* | 11/2017 | Tervo | G02B 5/1819 |
| 2018/0081265 A1* | 3/2018 | Singh | G03F 7/40 |
| 2018/0149796 A1* | 5/2018 | Xu | G02B 27/0101 |
| 2020/0110278 A1* | 4/2020 | Yang | G02B 27/0172 |
| 2020/0124782 A1* | 4/2020 | Xu | G02B 6/0076 |
| 2020/0124865 A1 | 4/2020 | Meyer Timmerman Thijssen et al. | |
| 2020/0142120 A1 | 5/2020 | Meyer Timmerman Thijssen et al. | |
| 2020/0194218 A1 | 6/2020 | Godet et al. | |
| 2020/0258717 A1* | 8/2020 | Gandhiraman | B29C 64/209 |
| 2020/0301062 A1 | 9/2020 | Young et al. | |
| 2020/0332414 A1 | 10/2020 | Guo et al. | |
| 2020/0363719 A1 | 11/2020 | Labonte et al. | |
| 2021/0157148 A1* | 5/2021 | Lou | G02B 5/1819 |
| 2021/0325777 A1 | 10/2021 | Ceballos et al. | |
| 2022/0026603 A1 | 1/2022 | Ceballos et al. | |
| 2022/0035091 A1* | 2/2022 | Xu | G02B 27/0101 |

FOREIGN PATENT DOCUMENTS

| | | | | |
|---|---|---|---|---|
| KR | 20180100044 A | * | 9/2018 | |
| WO | WO-2019180841 A1 | * | 9/2019 | ........ H01M 8/04014 |
| WO | 2020210425 A1 | | 10/2020 | |
| WO | 2021150311 A1 | | 7/2021 | |
| WO | 2022020101 A1 | | 1/2022 | |

OTHER PUBLICATIONS

International Search Report and Written Opinion dated Mar. 14, 2022 for Application No. PCT/US2021/059654.

* cited by examiner

OPTICAL DEVICE HAVING STRUCTURAL AND REFRACTIVE INDEX GRADATION, AND METHOD OF FABRICATING THE SAME

CROSS-REFERENCE TO RELATED APPLICATIONS

This application claims benefit of U.S. Provisional Application Ser. No. 63/114,919, filed Nov. 17, 2020, all of which is incorporated by reference in its entirety.

FIELD

Embodiments of the present disclosure generally relate to a method and apparatus for forming a substrate having a graduated refractive index.

BACKGROUND

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panel, such as lenses, to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

Optical devices are used to assist in overlaying images. Generated light is propagated through a waveguide until the light exits the waveguide and is overlayed on the ambient environment. The waveguide includes multiple device structures, e.g., gratings. Among the challenges faced in reducing signal loss in the output signal is displaying images having sufficient clarity for a visual observer. Conventional approaches to addressing this challenge include altering a thickness of the gratings or an encapsulation layer to tune the optical characteristics of the output signal. However, conventional approaches require multiple process steps requiring multiple process chambers in order to obtain the desired optical performance for the waveguide (display), which increase production and decrease yield.

Thus, there remains a need for systems and methods for an improved waveguide.

SUMMARY

Disclosed herein is a method and apparatus for forming multi-dimensional recess features in controlled, discrete, regions with graduated refractive index or depths across the surface of a substrate. In one example, a method of forming a waveguide structure includes forming a plurality of channels in a grating layer over a substrate. Each channel partially defines a portion of a plurality of grating structures. The method includes expelling plasma from an applicator having a head toward the plurality of grating structures. The plasma is formed in the head at atmospheric pressure. Additionally, the method includes changing a depth of the plurality of grating structures with the plasma by removing grating material from the plurality of grating structures. A change in depth corresponds to a change in a refractive index of the plurality of grating structures.

In another example, an optical processing system includes an applicator having a head. The head is configured to form a plasma therein. A non-transitory computer readable medium stores instructions. The instructions, when executed by a processor, cause a method to be performed in the applicator. The method includes forming a plurality of channels in a grating layer over the substrate. Each channel partially defines a portion of a plurality of grating structures. The method additionally includes expelling a plasma from an applicator having a head toward the plurality of grating structures. The plasma is formed in the head at atmospheric pressure. The method includes changing a depth of the plurality of grating structures with the plasma by removing grating material from the plurality of grating structures. A change in depth corresponds to a change in a refractive index of the plurality of grating structures.

In yet another example, an optical processing system includes an applicator configured to form a plasma. A non-transitory computer readable medium stores instructions. The instructions, when executed by a processor, cause a method to be performed in the applicator. The method includes forming the plasma in the applicator at atmospheric pressure. The method further includes forming a plurality of channels in a grating layer over a substrate. Each channel is partially defined by a portion of a plurality of grating structures. In addition, the method includes changing a refractive index of the plurality of grating structures by removing grating material from the plurality of grating structures. The refractive index corresponds to a change in depth of the plurality of grating structures. The grating material is removed by the plasma.

BRIEF DESCRIPTION OF THE DRAWINGS

So that the above recited features of the present disclosure can be understood in detail, a more particular description of the disclosure, briefly summarized above, may be had by reference to examples herein, some of which are illustrated in the appended drawings. However, it is to be noted that the appended drawings illustrate only examples and are therefore not to be considered limiting of the disclosure's scope. Accordingly, the appended drawings enable other equally effective examples.

In order to facilitate understanding, identical reference numerals have been used, where possible, to designate identical elements that are common features. It is contemplated that elements and features of one example may be beneficially incorporated into other examples without further recitation.

DETAILED DESCRIPTION

Figure 1:
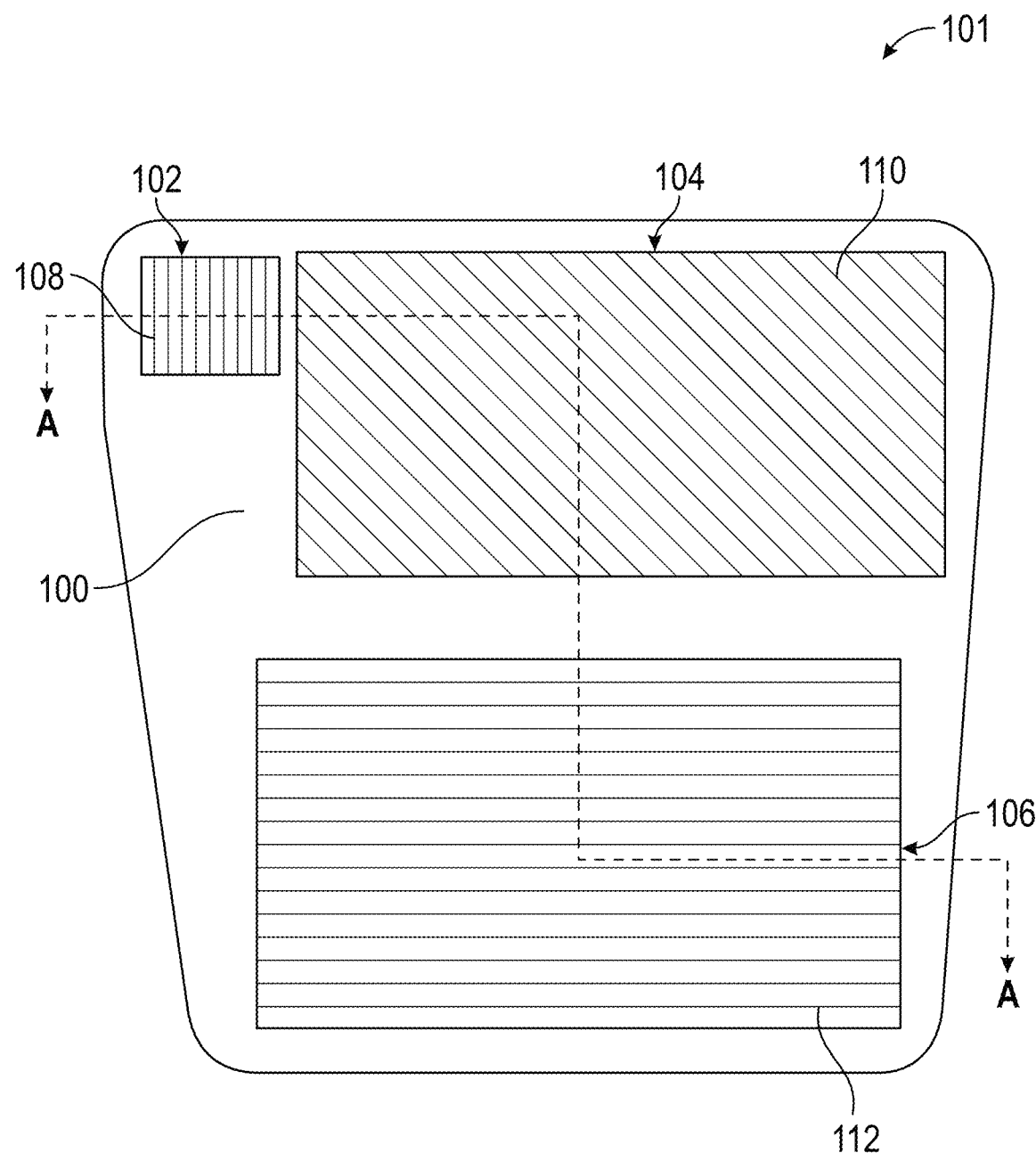
FIG. 1 is schematic top view of an optical device having a plurality of device structures.

An apparatus and method for forming a substrate having a graduated refractive index is disclosed herein. A measuring system is used to determine the amount of light entering an optical device. In one example, the optical device has an input coupling region, an intermediate region, and an output coupling region for exiting the amount of light, as in a waveguide combiner. In another example, the measuring system determines the amount of light entering a flat optical device, such as a waveguide having a metasurface with plural optical structures. The measuring system determines a profile of the light entering the optical device and the light exiting the optical device. Each of the input light and output light form a profile, which includes non-uniform light intensities. As light travels and is reflected along the internal surfaces of the optical device, light may escape through the internal surfaces of the optical device through diffraction with grating. Accordingly, when the light exits the intermediate coupling or the output coupling, an intensity profile across the surface of the grating structure can decrease as the distance the light travels increases. The output profile directly diffracts into the human eye and serves as indication of performance of the optical device. As such, blurred images at the edges of the device structures, i.e., gratings, may increase. Data representing an actual light profile is stored in a memory and used to generate a two-dimensional surface profile that will generate a uniform light profile.

The apparatus and method disclosed herein includes expelling plasma from an applicator having a head toward a plurality of grating structures disposed on a substrate. The plasma is formed in the head at atmospheric pressure. In one example, a material layer overlays the substrate. The plasma has a reactant therein capable of reacting with, and thus removing, portions of a material layer, or a portion of the plurality of grating structures. Additionally, the method includes changing a depth of the plurality of grating structures with the plasma by removing material therefrom. The applicator is movable with respect to the substrate, such that the plasma head is capable of being positioned over different discrete areas of the surface of the substrate, including over the material layer, or over the plurality of grating structures. Discrete portions of the material layer are etched by the plasma, in order to remove a portion of the material, and thereby form a three dimensional recess inwardly of the surface of the material.

As disclosed herein, generating the two-dimensional surface profile can include etching gratings to change a height of the gratings of the waveguide combiner. Alternatively, generating the two-dimensional surface profile includes depositing an overlayer, such as an encapsulation layer. In another example, etching and deposition are used to create the two-dimensional surface profile. Conventional approaches to depositing an encapsulation layer or etching gratings include the use of one or more processing chambers to perform etching, deposition, and or photolithography. By utilizing an atmospheric pressure plasma jet (APPJ), precise control of grating depth, grating refractive index, and encapsulation thickness across the optical device are obtained in a manner not achievable by conventional approaches. A diffraction efficiency of the optical device is increased by modifying a two-dimensional surface profile of an overlayer or a two-dimensional surface profile of gratings of the optical device, as disclosed herein. Advantageously, the two dimensional surface profile can be achieved at high throughput and at atmospheric pressure by etching and depositing with the APPJ.

FIG. 1 is a schematic top view of an optical device 101 having a plurality of device structures. It is to be understood that the substrate 100 described herein is a waveguide, in one example. As noted above, the optical device 101 is a flat optical device, such as a metasurface that has a plurality of device structures. In another example, the optical device 101 is a waveguide combiner, such as an augmented reality waveguide combiner having a plurality of device structures. The device structures are nanostructures having sub-micron dimensions, e.g., nano-sized dimensions, such as critical dimensions less than 1 µm. The substrate 100 includes an input coupling region 102 defined by a plurality of gratings 108, an intermediate region 104 defined by a plurality of gratings 110, and an output coupling region 106 defined by a plurality of gratings 112. The input coupling region 102 receives incident beams of light (a virtual image) having an intensity from a microdisplay. Each grating of the plurality of gratings 108 splits the incident beams into a plurality of modes, each beam having a mode.

Zero-order mode (T0) beams are refracted back or lost in the substrate 100 (i.e., waveguide combiner), positive first-order mode (T1) beams are coupled though the substrate 100 to the intermediate region 104, and negative first-order mode (T−1) beams propagate in the substrate 100 at a direction opposite to the T1 beams. The incident beams are split into T1 beams that have all of the intensity of the incident beams in order to direct the virtual image to the intermediate region 104. One approach to split the incident beam into T1 beams that have all of the intensity of the incident beams is to optimize the slant angle of each grating of the plurality of gratings 108 to suppress the T−1 beams and the T0 beams. The T1 beams undergo total-internal-reflection (TIR) through the substrate 100 until the T1 beams come in contact with the plurality of gratings 110 in the intermediate region 104. A portion of the input coupling region 102 may have gratings 108 with a slant angle different than the slant angle of gratings 108 from an adjacent portion of the input coupling region 102.

The T1 beams contact a grating of the plurality of gratings 110. The T1 beams are split into T0 beams refracted back or lost in the substrate 100, T1 beams that undergo TIR in the intermediate region 104 until the T1 beams contact another grating of the plurality of gratings 110, and T−1 beams that are coupled through the substrate 100 to the output coupling region 106. The T1 beams that undergo TIR in the intermediate region 104 continue to contact gratings of the plurality of gratings 110 until either the intensity of the T1 beams coupled through the substrate 100 to the intermediate region 104 is depleted, or remaining T1 beams propagating through the intermediate region 104 reach the end of the intermediate region 104. The plurality of gratings 110 must be tuned to control the T1 beams coupled through the substrate 100 to the intermediate region 104 in order to control the intensity of the T−1 beams coupled to the output coupling region 106 to modulate a field of view of the virtual image produced from the microdisplay from a user's perspective and increase a viewing angle from which a user can view the virtual image. One approach to control the T1 beams coupled through the substrate 100 to the intermediate region 104 is to optimize the slant angle of each grating of the plurality of gratings 110 to control the intensity of the T−1 beams coupled to the output coupling region 106. A portion of the intermediate region 104 may have gratings 110 with a slant angle different than the slant angle of gratings 110 from an adjacent portion of the intermediate region 104. Furthermore, the gratings 110 may have slant angles different than the slant angles of the gratings 108.

The T−1 beams coupled through the substrate 100 to the output coupling region 106 undergo TIR in the substrate 100 until the T−1 beams contact a grating of the plurality of gratings 112 where the T−1 beams are split into T0 beams refracted back or lost in the substrate 100, T1 beams that undergo TIR in the output coupling region 106 until the T1 beams contact another grating of the plurality of gratings 112, and T−1 beams coupled out of the substrate 100. The T1 beams that undergo TIR in the output coupling region 106 continue to contact gratings of the plurality of gratings 112 until either the intensity of the T−1 beams coupled through the substrate 100 to the output coupling region 106 is depleted, or remaining T1 beams propagating through the output coupling region 106 have reached the end of the output coupling region 106. The plurality of gratings 112 must be tuned to control the T−1 beams coupled through the substrate 100 to the output coupling region 106 in order to control the intensity of the T−1 beams coupled out of the substrate 100 to further modulate the field of view of the virtual image produced from the microdisplay from the user's perspective and further increase the viewing angle from which the user can view the virtual image. One approach to control the T−1 beams coupled through the substrate 100 to the output coupling region 106 is to optimize the slant angle of each grating of the plurality of gratings 112 to further modulate the field of view and increase the viewing angle. A portion of the intermediate region 104 may have gratings 110 with a slant angle different than the slant angle of gratings 110 from an adjacent portion of the intermediate region 104. Furthermore, the gratings 112 may have slant angles different than the slant angles of the gratings 108 and the gratings 110.

A material of the substrate 100 includes, but is not limited to, one or more of silicon (Si), silicon dioxide (SiO2), glass, plastic, polycarbonate, and sapphire-containing materials. In some embodiments, the substrate 100 includes doped glass. The substrate 100 may include other suitable materials, including, but not limited to, amorphous dielectrics, non-amorphous dielectrics, crystalline dielectrics, silicon oxide, polymers, and combinations thereof. In some examples, which can be combined with other embodiments described herein, the substrate includes a transparent material. Suitable examples may include an oxide, sulfide, phosphide, telluride or combinations thereof. In one example, the substrate includes silicon (Si), silicon dioxide (SiO$_2$), germanium (Ge), silicon germanium (SiGe), sapphire, and high-index transparent materials such as high-refractive-index glass. For example, the substrate 100 includes glass doped with a heavy dopant such as lanthanum (La), zirconium (Zr), zinc (Zn), and the like. The materials of the substrate 100 may further have rollable and flexible properties. In one example, the material of the substrate 100 includes, but is not limited to, materials having a refractive index between about 1.5 and about 2.4. For example, the substrate 100 may be a doped high index substrate having a refractive index between about 1.7 and about 2.4.

A portion of the intermediate region 104 may have gratings 110 with a slant angle different than the slant angle of gratings 110 from an adjacent portion of the intermediate region 104. Furthermore, the gratings 110 may have slant angles different than the slant angles of the gratings 108. A portion of the output coupling region 106 may have gratings 112 with a slant angle different than the slant angle of gratings 112 from an adjacent portion of the output coupling region 106. Furthermore, the gratings 112 may have slant angles different than the slant angles of the gratings 108 and the gratings 110.

The depth of the gratings 108, 110, or 112 may vary across the input coupling region 102, the intermediate region 104, and/or the output coupling region 106 in examples described herein. In some examples, the depth of the gratings 108, 110, or 112 vary smoothly over the grating area. In one example, the depth of the gratings 108, 110, or 112 may range from about 10 nm to about 500 nm across the grating area. The grating area in an example can range from approximately 20 mm to approximately 50 mm on a given side. Therefore, as one example, the angle of the change in the depth of the gratings may be on the order of 0.0005 degrees.

The refractive index of the gratings 108, 110, or 112 may vary across the input coupling region 102, the intermediate region 104, and/or the output coupling region 106 in examples described herein. In some examples, the refractive index of the gratings 108, 110, or 112 vary smoothly over the grating area. In one example, the refractive index of the gratings 108, 110, or 112 may range from about 1.3 to 2.5 across the grating area. The grating area, in an example, can range from about 20 mm to about 50 mm.

Figure 2:
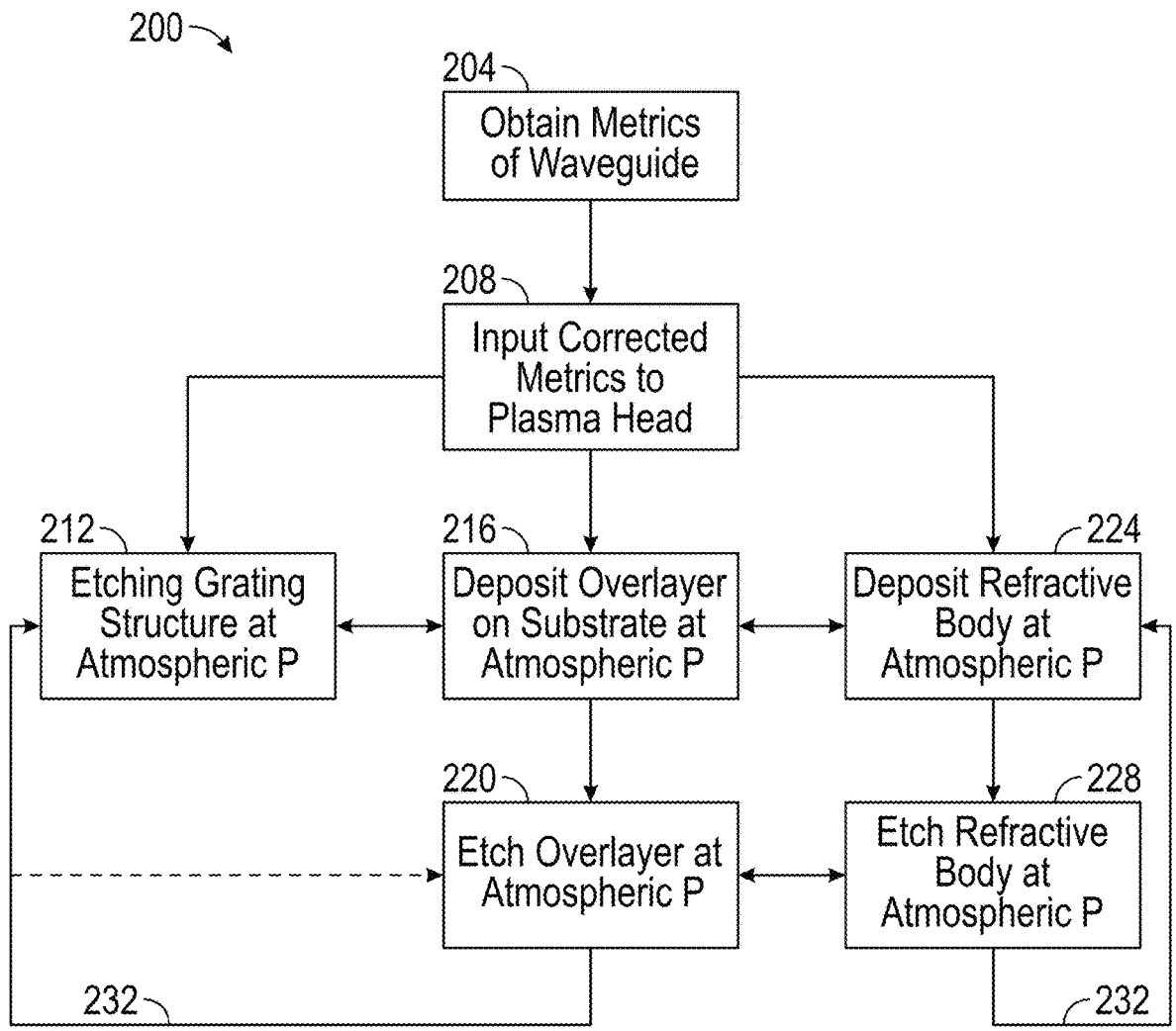
FIG. 2 is a flow diagram of one example of the different stages of deposition and etching of the substrate in FIG. 1.

FIG. 2 is a flow diagram of a method 200 of etching and depositing materials disposed on a substrate, e.g., the substrate 100 in FIG. 1, at atmospheric pressure. Different stages of the method 200 for etching and depositing materials disposed on the substrate are illustrated in FIGS. 2-6D.

Figure 3:
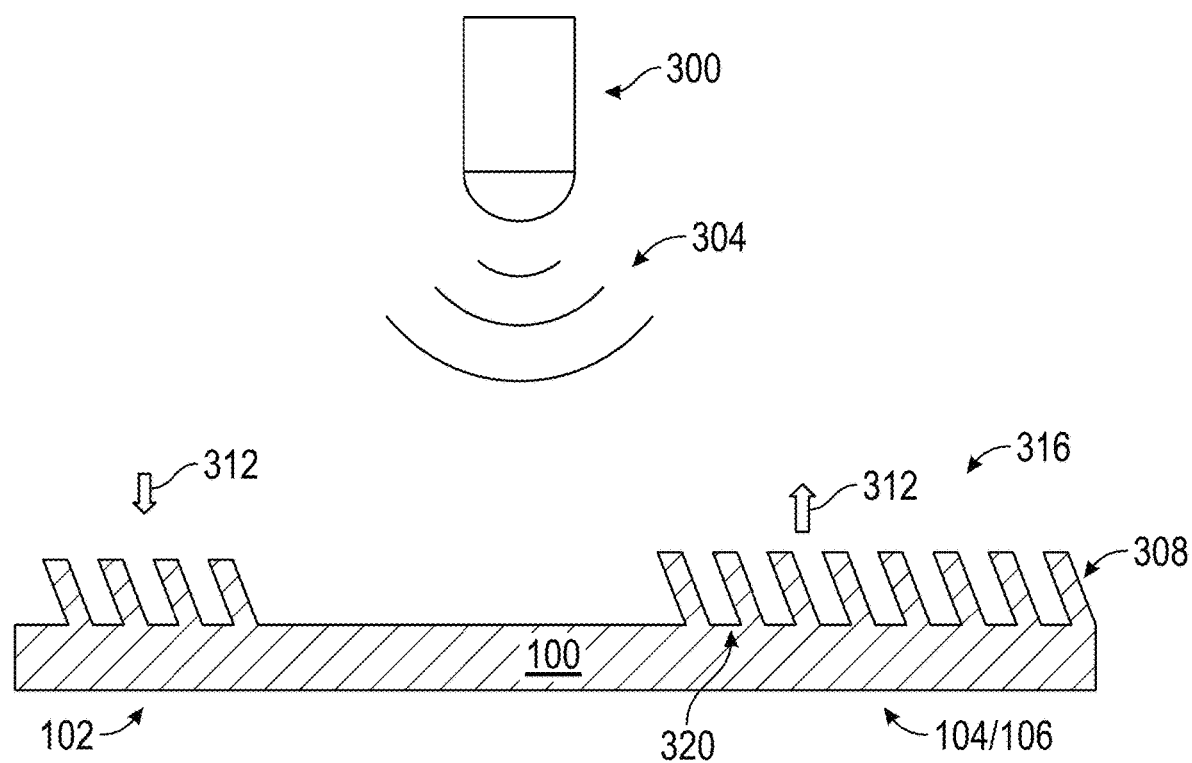
FIG. 3 is a schematic side view of a measuring instrument configured to determine a profile of light entering and exiting the substrate shown in FIG. 1, as shown along line A-A.

Method 200 begins at Operation 204 where metrics of a waveguide is determined, as illustrated in FIG. 3. FIG. 3 is a schematic side view of a measuring instrument 300 adjacent to the substrate 100 shown in FIG. 1, a cross-section of which is shown taken along line A-A. The measuring instrument 300 transmits and receives a signal 304 of light 312 entering and exiting the substrate 100. The measuring instrument 300 determines an intensity of the light 312 that enters the input coupling region 102 and an intensity of the light 312 that exits each of the intermediate region 104 and the output coupling region 106. Herein, gratings 308 refer to one or more of gratings 108, 110, or 112 shown in FIG. 1. In one example, which can be combined with other examples described herein, regions of the device structures correspond to one or more gratings 308, such as a first grating, a second grating, and a third grating. The gratings 308 can also be referred to a plurality of device structures when disposed on a metasurface, in another example. Gratings 308 are formed on the substrate 100, and the gratings 308 have a plurality of channels 320 formed therebetween. A profile 316 of the intensity of light 312 entering the gratings 308 of the input coupling region 102 is determined. The profile 316 also includes data corresponding to the intensity of light 312 exiting the gratings 308 of each of the intermediate region 104 and the output coupling region 106. The gratings 308 are substantially uniform. Light intensity of the profile 316 is non-uniform, as the light intensity is reduced over a length of the intermediate region 104 and the output coupling region 106. In one example, the measuring instrument 300 is an optical measuring device, such as a laser. In one example, the gratings 308 are generated by a lithography and dry etch process, discussed in greater detail below.

Figure 4:
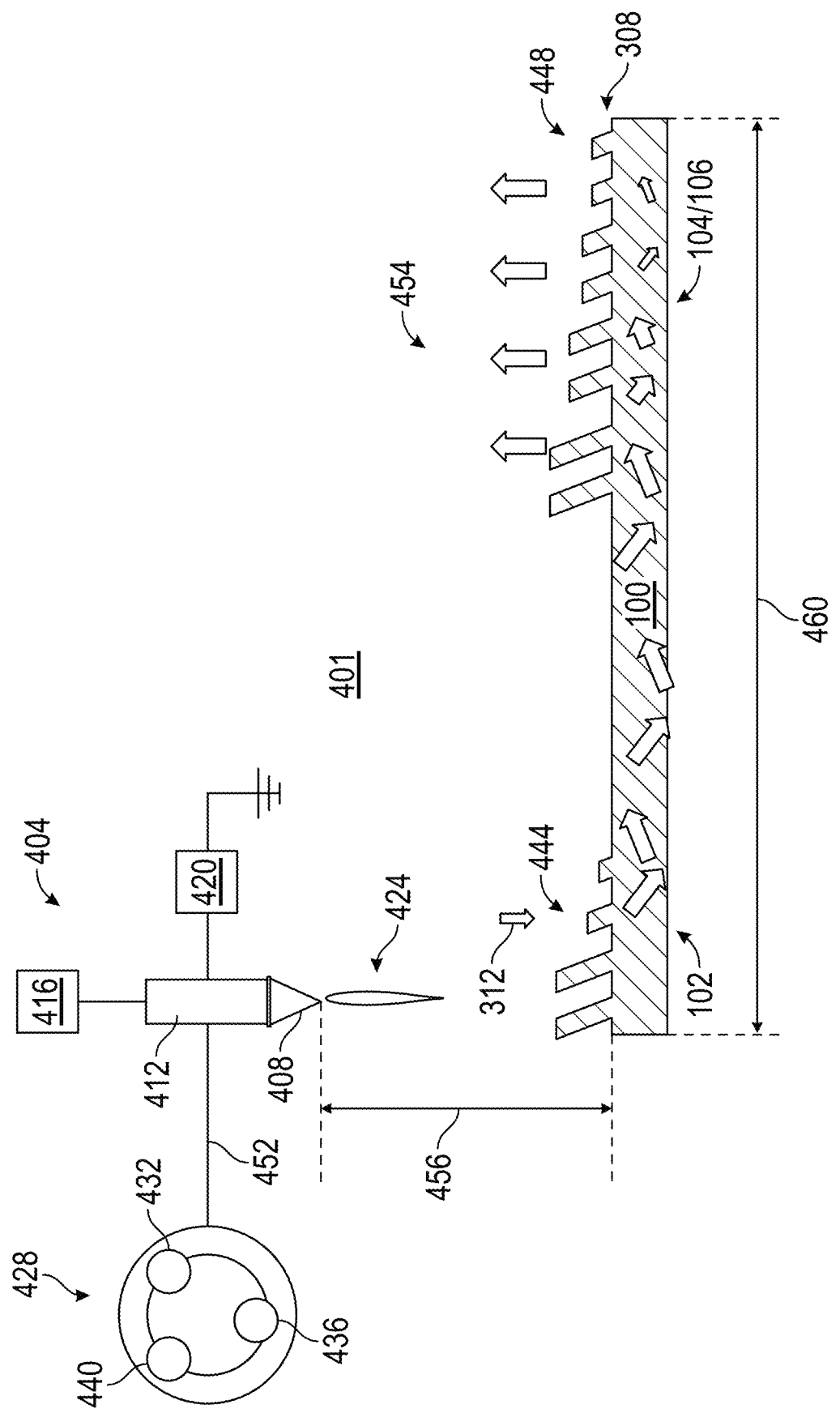
FIG. 4 shows an applicator disposed within an environment suitable for processing the substrate, shown in FIG. 1.

At operation 208, the determined metrics are corrected and loaded into an applicator 404 configured to form a plasma 424. FIG. 4 shows the applicator 404 disposed within an environment 401 suitable for processing the substrate 100, shown in FIG. 1. The applicator 404 is coupled to a controller 428. One or more transmission lines 452 connect the controller 428 to the body 412, in one example. The profile 316 generated by the measuring instrument 300 is used to generate a target profile that is uploaded to the controller 428. The target profile corrects non-uniformities in the profile 316. The target profile includes data representing structural details and a refractive index of the gratings 308.

The applicator 404 includes a head 408 and a body 412. The body 412 is electrically coupled to a power source 420 through one or more transmission lines 452. The power source 420 is grounded. A gas source 416 is fluidly coupled to the body 412, and is configured to provide a gas to an internal space of the body 412. In one example, the gas provided to the internal space of the body 412 is one or more of argon (Ar), helium (He), nitrogen ($N_2$), oxygen ($O_2$), or hydrogen ($H_2$). A DC power of the applicator is between about 5 kV and about 15 kV, such as about 10 kV or 12 KV. In another example, the DC power of the applicator 404 is between about 10 kHz to about 100 kHz. An RF power is applied between about 300 watts and about 5 GHz, such as about 1 GHz, or about 2 GHz.

In one example, the method 200 proceeds to Operation 212 where the gratings 308 of the substrate 100 are etched at atmospheric pressure. Plasma power, distance from the head to substrate, and relative head speed with respect to the substrate are parameters that can create a target profile. The distance 456 is between about 0.5 mm to about 10 mm, in one example. In another example, the distance 456 is between about 1.5 mm and about 7 mm, such as about 6 mm. In yet another example, the distance 456 is between about 2.0 mm and about 5.5 mm, such as about 5 mm. In another example, the distance 456 is between about 3.5 mm and about 4.5 mm, such as about 3.75 mm or about 4.25 mm. The relative speed between the head 408 relative to the substrate 100 is between about 1 mm/s to about 30 mm/s, such as about 2.5 mm/s, or about 3.25 mm/s. In another example of the disclosure herein, the relative speed is about 5 mm/s to about 25 mm/s, such as about 17 mm/s or about 20.5 mm/s. In yet another example, the relative speed is between about 7.5 mm/s and about 15 mm/s, such as about 10 mm/s or about 12.5 mm/s.

In one example, the plasma 424 is formed in the environment 401 when gas is introduced into the body 412 of the applicator 404. Ions are created when the gas is disassociated within the plasma 424 by application of the power source 420. The ions are expelled toward the substrate 100, and upon impact with the gratings 308, the ions remove molecules from the gratings 308. A distance 456 from the head 408 of the applicator 404 to the substrate 100 is controlled by parameters of the target profile. The distance 456 to the substrate 100 is controlled to remove portions of the gratings 308, until the target profile is achieved. The target profile can include each or both of an input profile 444 and an output profile 448. In one example, the applicator 404 is an atmospheric pressure plasma jet (APPJ).

As the light 312 enters the input coupling region 102, light 312 is reflected between a top and bottom surface of the substrate 100, as the light 312 travels a length 460 of the substrate 100. The intensity of the light 312 along the length 460 of the substrate 100 decreases as the distance from the input coupling region 102 increases. The output profile 448 enables a light profile 454 to be uniform across the gratings 308, thus reducing blur or other visual defects near the periphery of the gratings 308. Thus, the output profile 448 increases the diffraction efficiency of the intermediate region 104 and the output coupling region 106.

The controller 428 signals to at least one or more electrodes (not shown) coupled to the body 412 of the applicator 404, the gas source 416, or the power source 420. The controller 428 includes a processor 432, a memory 436, and support circuits 440 that are coupled to one another. The processor 432 may be one of any form of general purpose microprocessor, or a general purpose central processing unit (CPU), each of which can be used in an industrial setting, such as a programmable logic controller (PLC), supervisory control and data acquisition (SCADA) systems, or other suitable industrial controller. The memory 436 is non-transitory and may be one or more of readily available memory such as random access memory (RAM), read only memory (ROM), or any other form of digital storage, local or remote. The memory 436 contains instructions, that when executed by the processor 432, facilitates execution of the method 200. The instructions in the memory 436 are in the form of a program product such as a program that implements the method of the present disclosure. The program code of the program product may conform to any one of a number of different programming languages. Illustrative computer-readable storage media include, but are not limited to: (i) non-writable storage media (e.g., read-only memory devices within a computer such as CD-ROM disks readable by a CD-ROM drive, flash memory, ROM chips, or any type of solid-state non-volatile semiconductor memory) on which information is permanently stored; and (ii) writable storage media (e.g., hard-disk drive or any type of solid-state random-access semiconductor memory) on which alterable information is stored. Such computer-readable storage media, when carrying computer-readable instructions that direct the functions of the methods described herein, are examples of the present disclosure. Operation 212 can proceeded directly to Operation 216, disclosed in detail below, as shown in FIG. 3. In yet another example, the method 200 proceeds from Operation 208 to Operation 216.

Figure 5A:
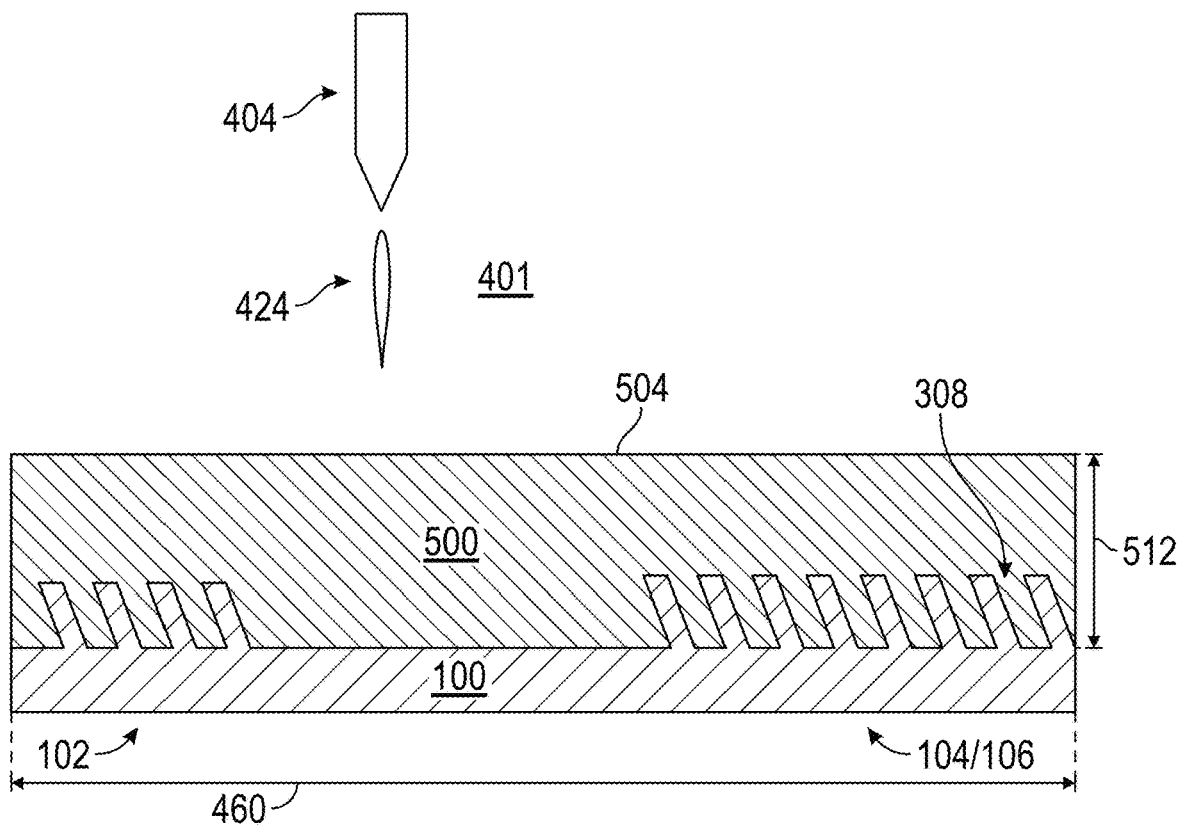
FIGS. 5A-5B are schematic sectional views of an overlayer during different stages of deposition and etching of the overlayer.

At Operation 216 an overlayer 500 is deposited over the substrate 100 at atmospheric pressure, as shown in FIG. 5A. The overlayer 500 having a substantially planar surface 504 is deposited to a desired thickness over the substrate 100. In one example, the overlayer 500 is an encapsulation layer. The encapsulation layer includes materials such as metals and dielectrics of varying dielectric constants and refractive indices. The encapsulation layer reduces glare or reflection on the substrate 100. The overlayer 500 can be deposited to a depth 512 and a specified length 460.

The overlayer 500 is applied to gratings 308 with one of an FCVD, PVD or spin coating methods, in one example. In another example, plasma 424 is formed in the environment 401 by the applicator 404 in order to deposit the overlayer 500. The overlayer 500 is formed by vaporizing a precursor with the plasma 424. Exemplary materials for the overlayer 500, includes at least one of polyimides, polyimide blends, metal-organic polyimide blends, metal oxides, metal nitrides, $Al_2O_3$, $SiO_2$, TiO, TaO, AlN, SiN, $SiO_xN_x$, TiN, TaN, any of the materials forming the substrate 100 or any one of the gratings 308.

In one example, the overlayer 500 herein enables control over diffraction efficiency along the gratings 308. The low refractive index contrast of the overlayer 500 (e.g., about 0.2 or less) decreases the diffraction efficiency compared to un-encapsulated gratings (i.e., gratings without the overlayer 500). Device structures not having the overlayer 500 may be surrounded by air (i.e., refractive index of 1) contacting the surface or may include a global encapsulant having a low refractive index (e.g., refractive index contrast greater than about 0.2). In some embodiments, the diffraction efficiency of the gratings 308 may be about 2.5% or less, alternatively from about 1% to about 50% such as from about 1% to about 40%, such as from about 1% to about 30%, such as from about 1% to about 20%, such as from about 1% to about 10%, such as from about 1% to about 5%, such as from about 1% to about 2.5%, alternatively from about 2.5% to about 5%, alternatively from about 5% to about 10%, alternatively from about 10% to about 20%, alternatively from about 20% to about 30%, alternatively from about 30% to about 40%, or alternatively from about 40% to about 50%.

The overlayer 500 has a refractive index of from about 1.6 to about 2.4, such as from about 1.7 to about 2.3, such as from about 1.8 to about 2.2, such as from about 1.8 to about 2, such as from about 1.9 to about 2, or such as from about 1.95 to about 2. Alternatively, the overlayer 500 has a refractive index from about 2 to about 2.2, such as from about 2 to about 2.1, such as from about 2 to about 2.05, such as about 2, or alternatively from about 1.8 to about 1.85. In another example, the overlayer 500 has a refractive index from about 1.85 to about 1.9, alternatively from about 1.9 to about 1.95, alternatively from about 1.95 to about 1.96, alternatively from about 1.96 to about 1.97, or alternatively from about 1.97 to about 1.98. In yet another example, the overlayer 500 has a refractive index from about 1.98 to about 1.99, alternatively from about 1.99 to about 2, alternatively from about 2 to about 2.01, alternatively from about 2.01 to about 2.02, or alternatively from about 2.02 to about 2.03. Another exemplary refractive index of the overlayer 500 is from about 2.03 to about 2.04, alternatively from about 2.04 to about 2.05, alternatively from about 2.05 to about 2.1, alternatively from about 2.1 to about 2.2, or alternatively from about 1.95 to about 2.05.

In another example, the overlayer 500 is a mask layer. The mask may be formed from a photoresist, a hard mask material or other suitable material. The photoresist may be a positive-tone photoresist and/or a negative-tone photoresist, each being capable of undergoing a chemically amplified reaction. The mask layer is an organic polymer material, in one example. Other suitable materials may be used for the mask, including other fluorine containing polymers. In another example, the mask can be at least one of a positive or negative tone photoresist, a metal-containing hardmask, a carbon-containing hardmask, an organic planarization layer (OPL), and other suitable hardmask materials.

In another example, the overlayer 500 is a grayscale resist, or grayscale mask. The grayscale resist can be deposited in any pattern to produce the desired depth and shape of the substrate 100. Gratings 308 of varying depth can be created using gray-tone lithography, also known as grayscale lithography. Grayscale lithography is a one-step process used to create three-dimensional microstructures in a photoresist layer using an optical gray-tone (or grayscale) mask. Grayscale masks let varying amounts of light pass through to create depth-modulated gratings 308. Using grayscale lithography to create depth-modulated gratings 308 allows for fewer processing operations and increases wedge resolution of a surface profile 508. As one example, the surface profile 508 can have a concave or convex pattern. In another example, a one-dimensional or two-dimensional grayscale mask pattern may be used to shape the grating height of the gratings 308. Additionally, each of the gratings 308 can have an angle 520 measured relative to the planar surface 504. The angle 520 is, for example, about 0 degrees to about 70 degrees.

Figure 5B:
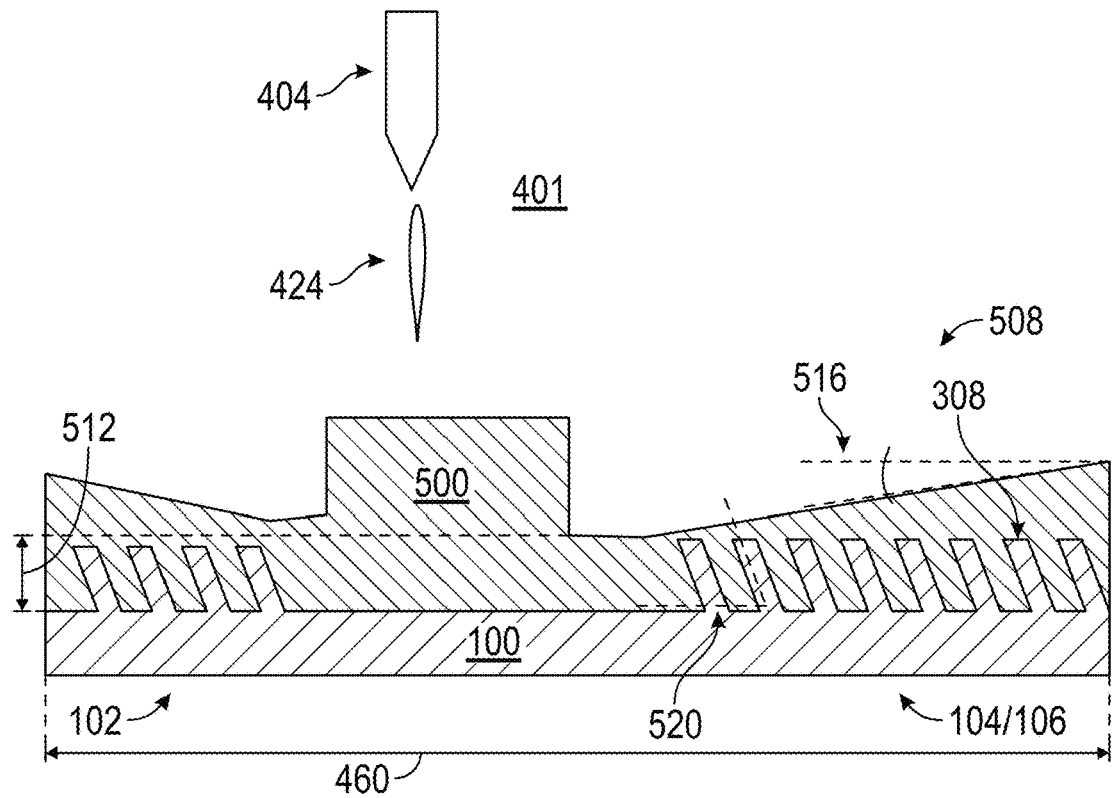

As shown in FIG. 5B, portions of the overlayer 500 are removed by etching with plasma 424 from the applicator, at Operation 220. The surface profile 508 corresponds to a refractive index of the overlayer 500 or substrate 100. The surface profile 508 includes the depth 512, surface angle 516, and length 460 parameters. Additional parameters such as the distance 456 from the head 408 of the applicator 404 to the substrate 100 (as shown in FIG. 4) are controlled to etch the overlayer 500 until the surface profile 508 is achieved. As noted above, adjusting parameters such as plasma power and speed of the applicator 404 relative to the length 460 of the substrate 100, can also be adjusted to create the surface profile 508. In one example, the surface profile 508 can include portions having linear or non-linear slopes (i.e., a non-linear gradation) with respect to the substrate 100. Additionally, the surface profile 508 can include several portions that oscillate with respect to the substrate 100.

Figure 6A:
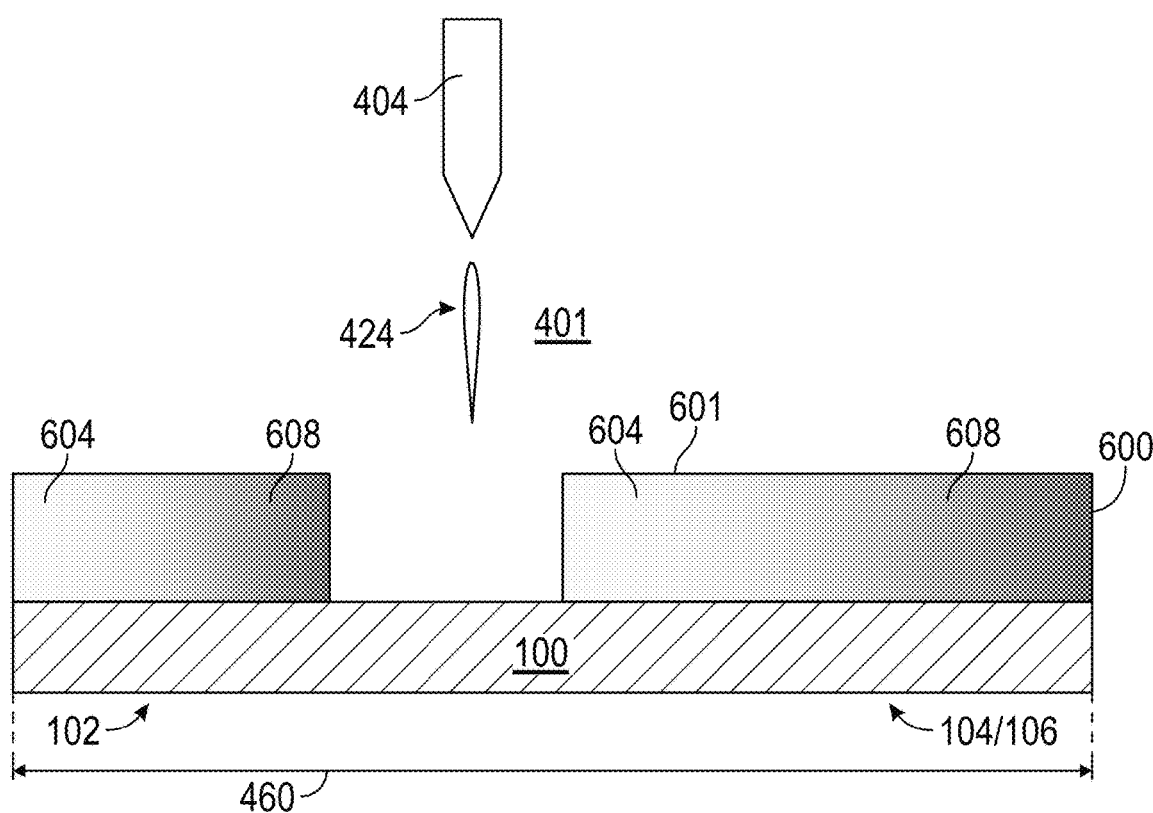
FIG. 6A-6D, are schematic sectional views of a refractive body having various refractive indices during different stages of deposition and etching of the refractive body.

At Operation 224, a refractive body 600 is deposited on the substrate 100 at atmospheric pressure. The refractive body 600 has a planar surface 601 and includes a first refractive layer 604 and a second refractive layer 608. Although the second refractive layer 608 is shown as a single feature, the second refractive layer 608 can include additional refractive layers. As such, the second refractive layer 608 can include additional individual layers having different refractive indices. Accordingly, the change in the composition of refractive body 600 from first refractive layer 604 to the second refractive layer 608 is gradual. Otherwise stated, the refractive body 600 is deposited such that no distinct or visible layers are observed between the first refractive layer 604 and the second refractive layer 608. Advantageously, the refractive index of the refractive body 600 gradually modulates independently of the thickness of the refractive body 600. As shown in FIG. 6A, the refractive indices of the refractive body 600 modulate along the length 460 of the substrate 100. In another example, the refractive indices of the refractive body 600 modulate in a direction perpendicular to the length 460. The diffraction efficiency of the refractive body 600 is modified by applying different materials during deposition of the refractive layers 604, 608.

As shown, in FIG. 6A, the first refractive layer 604 is deposited in contact and adjacent to the second refractive layer 608. FIGS. 6A-6D are schematic sectional views of the substrate 100 during deposition and removal of an overlayer having different refractive indices.

One or more gases from the gas source 416 are flowed into the environment 401 to deposit the refractive body 600 (i.e., the first refractive layer 604 and the second refractive layer 608) onto the substrate 100 using the applicator 404. Exemplary precursor gases include nitrogen gas ($N_2$), nitrogen dioxide ($NO_2$), fluorine gas ($F_2$), oxygen gas ($O_2$), hydrogen gas (H2), $H_2O$ in vapor form, methane (CH4), carbon monoxide (CO), methane ($CH_4$), and carbon dioxide ($CO_2$), argon (Ar), and helium (He).

The first refractive layer 604 may be a sol-gel solution or a nanoparticle solution. The first solution may include silicon dioxide ($SiO_2$), silicon oxycarbide (SiOC), zirconium dioxide ($ZrO_2$), and/or titanium dioxide ($TiO_2$). Proportions of $SiO_2$, SiOC, $ZrO_2$, and/or $TiO_2$ in the first solution are controlled to result in a first refractive index. For example, the first solution may contain a first ratio of $TiO_2$ to $SiO_2$, SiOC, and/or $ZrO_2$. In one embodiment, sol-gel precursors for SiO$_2$ may include tetramethyl orthosilicate (TMOS), methyl-tri-methoxy-silane (MTMS), and tetra-ethyl orthosilicate (TEOS).

The second refractive layer 608 may include a second solution. The second solution may be a sol-gel solution or a nanoparticle solution. The second solution may include SiO$_2$, SiOC, ZrO$_2$, and/or TiO$_2$. Proportions of SiO$_2$, SiOC, ZrO$_2$, and/or TiO$_2$ in the second solution are controlled to result in a second refractive index. The second refractive index may be different than the first refractive index. For example, the second solution may contain a second ratio having a higher ratio of TiO$_2$ to SiO$_2$, SiOC, and/or ZrO$_2$ than the first ratio to result in the second refractive index having a higher refractive index than the first refractive index or the second ratio may have a lower ratio of TiO$_2$ to SiO$_2$, SiOC, and/or ZrO$_2$ than the first ratio to result in the second refractive index having a lower refractive index than the first refractive index.

A first refractive layer may include a first material, and a subsequent refractive layer may include a second material different from the first material. A series of refractive layers of metals and/or dielectrics of varying dielectric constants and refractive indices, such as a graded anti-reflective coating (ARC), reduce glare, reflection, or blur. The refractive index of the encapsulation layer can be tuned from over about 2.0 to about 1.47. Exemplary ranges for the refractive index of the refractive body 600 can be between about 1.5 and about 2.0, for example about 1.75. In yet other example, the refractive index of the refractive body 600 can between about 1.0 and about 1.5, for example about 1.47. In yet another example, the refractive index of the refractive body 600 can be between about 1.0 and about 1.5, for example about 1.48 or about 1.49; or between about 1.0 and about 1.5, for example about 1.47.

Each of the first refractive layer and subsequent refractive layer(s), such as the second refractive layer, can have a refractive index of from about 1.6 to about 2.4, such as from about 1.7 to about 2.3, such as from about 1.8 to about 2.2, such as from about 1.8 to about 2, such as from about 1.9 to about 2, such as from about 1.95 to about 2. Alternatively, the overlayer 500 has a refractive index from about 2 to about 2.2, such as from about 2 to about 2.1, such as from about 2 to about 2.05, such as about 2, alternatively from about 1.8 to about 1.85. In another example, the overlayer 500 has a refractive index from about 1.85 to about 1.9, alternatively from about 1.9 to about 1.95, alternatively from about 1.95 to about 1.96, alternatively from about 1.96 to about 1.97, alternatively from about 1.97 to about 1.98. In yet another example, the overlayer 500 has a refractive index from about 1.98 to about 1.99, alternatively from about 1.99 to about 2, alternatively from about 2 to about 2.01, alternatively from about 2.01 to about 2.02, alternatively from about 2.02 to about 2.03. Another exemplary refractive index of the overlayer 500 is from about 2.03 to about 2.04, alternatively from about 2.04 to about 2.05, alternatively from about 2.05 to about 2.1, alternatively from about 2.1 to about 2.2, alternatively from about 1.95 to about 2.05.

Figure 6B:
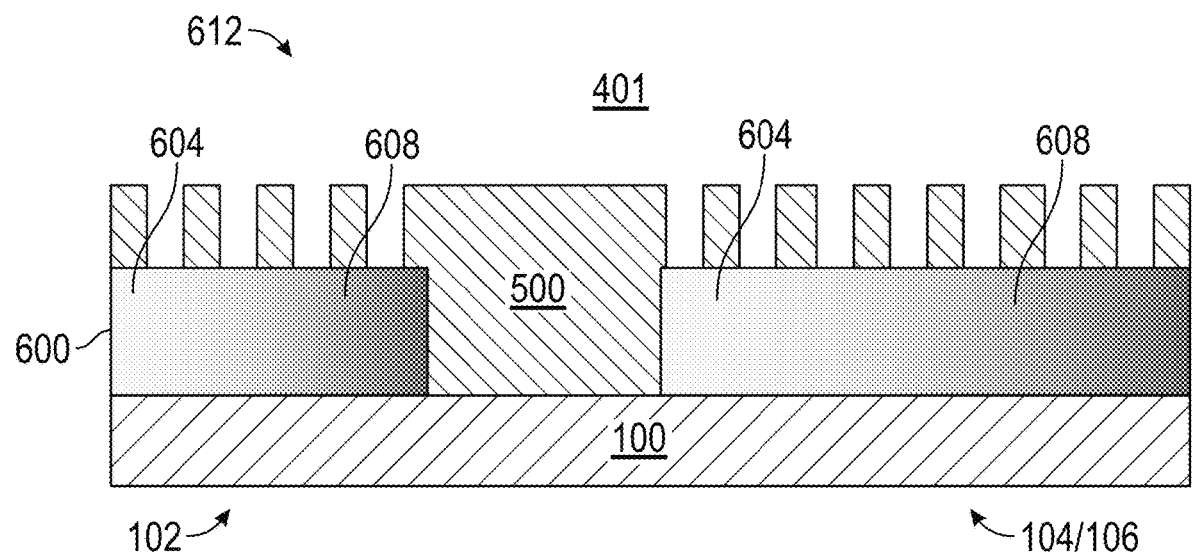

In another example, shown in FIG. 6B, an overlayer 500 is formed over and in contact with the refractive body 600. The overlayer 500 can be a mask layer deposited in contact with and over the refractive body 600 using the applicator 404. The refractive index pattern is programed into to the controller 428 in order to match the target profile. Openings 612 are made through the overlayer 500, exposing a portion of the planar surface 601 of the refractive body 600. As described above at Operation 216, the overlayer 500 can be deposited by FCVD, PVD, spin coating, or deposited by ignited plasma 424 from the applicator 404 in the environment 401. In one example, lithography is performed to transfer a pattern into the refractive body 600. A material of the mask layer includes any hard mask material, such as photoresist, SiO$_2$, Cr.

Figure 6C:
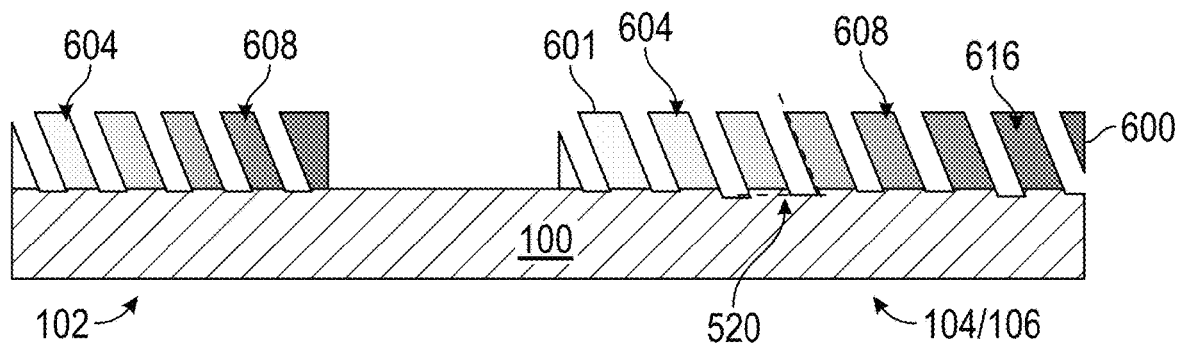

At Operation 228, the refractive body 600 is etched using the applicator 404. An etch process can be performed, as described above at Operation 212 or at Operation 220, in order to remove portions of the refractive body 600 thus forming graduated refractive gratings 616 of varying refractive indices, as shown in FIG. 6C. Accordingly, the gratings 308 include portions of the first refractive layer 604 and the second refractive layer 608. The second refractive layer 608 can include additional individual layers of varying refractive indices. As noted, each of the gratings 308 can have an angle 520 measured relative to the planar surface 601. The angle 520 can be, for example, about 0 degrees to about 80 degrees, such as about 70 degrees. In another example, the angle 520 is between about 5 degrees and about 65 degrees, such as about 45 degrees, or about 55 degrees.

Figure 6D:
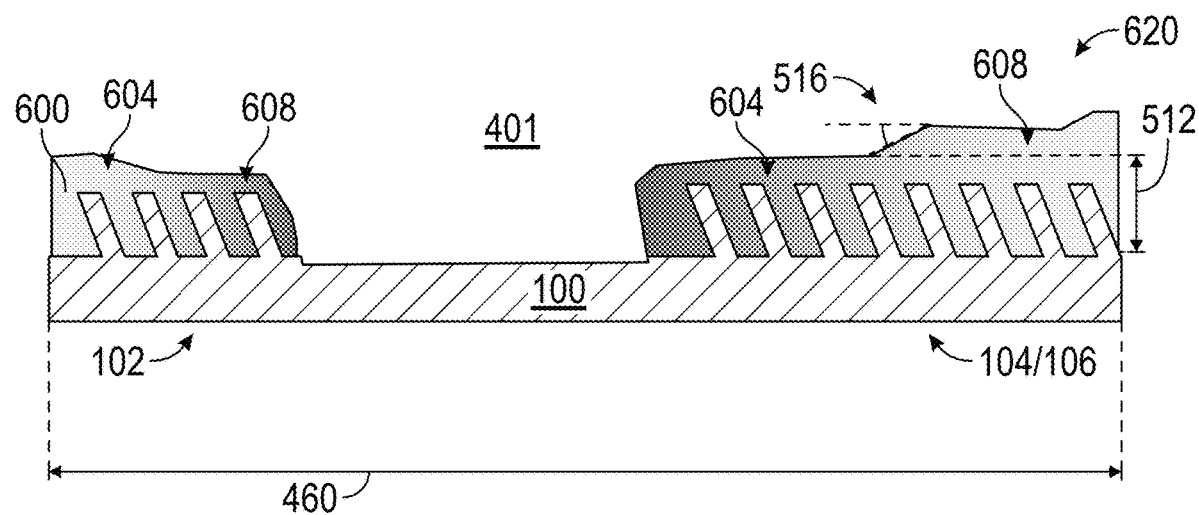

As shown in FIG. 6D, a surface profile 620 having a modulating refractive index is formed in the refractive body 600. The surface profile 620 is based upon the target profile described above. Plasma 424 is utilized to etch the surface profile 620 into the planar surface 601 of the refractive body 600. The refractive body 600 includes the first refractive layer 604 and the second refractive layer 608. The surface profile 620 includes a depth 512, surface angle 516, and the length 460 parameters. As noted above, the distance 456 from the head 408 of the applicator 404 to the substrate 100, plasma power, and a speed of the applicator 404 relative to the length 460 of the substrate 100, can also be adjusted to create the surface profile 620. The surface profile 620 can include portions having linear or non-linear slopes, and can include several portions that oscillate with respect to the substrate 100. In one example, the surface profile 620 includes a portion this is hydrophobic and another portion that is hydrophilic. In one example, the refractive body 600 is deposited at Operation 224 and an overlayer 500 is deposited at Operation 216. The method 200 can then proceed to Operation 220 where the overlayer 500 is etched. The openings 612 are formed in the overlayer 500 through photolithography. The method then proceeds to Operation 228 where the refractive body 600 is etched. In one example, the graduated refractive gratings 616 are formed as shown in FIG. 6C. In another example, the surface profile 620 is formed as shown in FIG. 6D. Further still, in yet another example, the refractive body 600 is deposited with the surface profile 620, in substantially the same manner as the refractive body 600 is deposited, as shown in FIG. 6A, or the overlayer 500, as shown in FIG. 5A-B.

At Operation 232, the method 200, in one example, returns to Operation 212. In one example, the gratings 308 are etched, and in another example, the graduated refractive gratings 616 are etched. The method 200 is repeated until the gratings 308 reach the target profile thus producing uniform light profile 454. In another example, the method 200 is repeated until the target profile is achieved and uniform light profile 454 exits the graduated refractive gratings 616. As shown in FIG. 2, in other examples, Operation 216 or Operation 224 can proceed to Operation 232.

In yet another example, the method 200 at Operation 232 returns directly to Operation 224, and a subsequent layer of the second refractive layer 608 is deposited. The method 200 is repeated until the refractive body 600 has a desired refractive index. In yet another example, the method 200 at Operation 232 returns to Operation 220 where another portion of the overlayer 500 is etched having the surface profile 508. The method 200 is repeated until the overlayer 508 has the desired surface profile 508. The method 200 can also be repeated until the refractive body 600 has the desired surface profile 620, in yet another example.

Figure 7A:
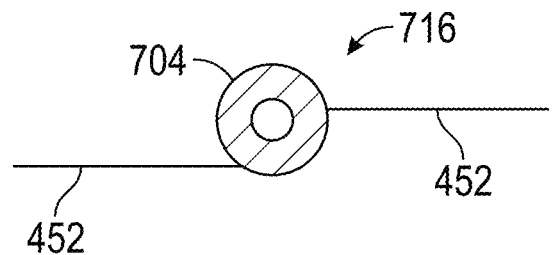
FIGS. 7A-7C are alternative examples of a head of the applicator shown in FIG. 4.
Figure 7B:
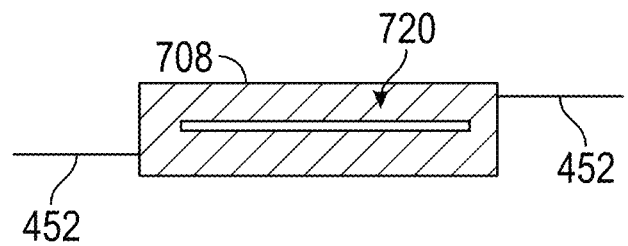
Figure 7C:
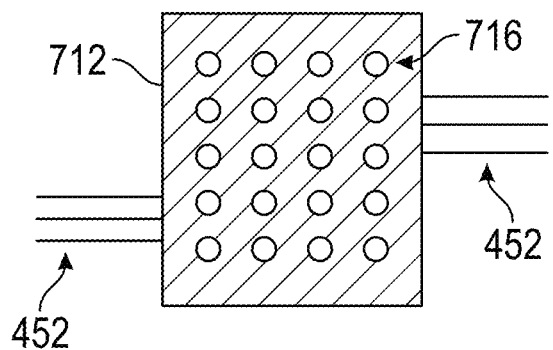

FIGS. 7A-7C are alternative examples of the head 408 of the applicator 404 shown in FIG. 4. In one example, the head 408 is a nozzle 704 having an opening 716 through which the jet of the plasma 424 is expelled, as shown in FIG. 7A. In another example, the head 408 is a quadrilateral head 708 having a rectangular opening 720. As illustrated in FIG. 7B, the quadrilateral head 708 has a substantially rectangular perimeter, but is not limited to this arrangement. In another example, quadrilateral head 708 is substantially square. In yet another example, shown in FIG. 7C, the head 408 is an array 712, the array 712 having n x m openings 716. A 4×5 array 712 of openings 716 is shown, in a non-limiting example. The disclosure herein is not limited to that arrangement and includes arrays where a value of n is not equal to a value of m, such as a 5×4, 2×3, or 5×9 array of openings 716. Exemplary arrays 712 also include square arrays where a value of n is equal to a value of m, such as a 3×3, 5×5, or a 10×10 array of openings 716. Each of the nozzle 704, the quadrilateral head 708, and the array 712 can be utilized with the method 200 to achieve the target profile, as disclosed herein.

Disclosed herein are a method and apparatus for forming a substrate having a graduated refractive index. Advantageously, precise control of grating depth, grating refractive index, and encapsulation thickness across the waveguide are obtained. While the foregoing is directed to specific examples, other examples may be devised without departing from the basic scope thereof, and the scope thereof is determined by the claims that follow.

We claim:

1. A method of forming a waveguide structure, comprising:
   expelling plasma from an applicator having a head toward a plurality of grating structures formed on a substrate, the plasma formed at atmospheric pressure in the head;
   changing a depth of the plurality of grating structures with the plasma by removing grating material from the plurality of grating structures, and
   depositing an overlayer over and in contact with the grating structures and to form a surface profile of the overlayer, the surface profile having a surface angle defining a slope with respect to the substrate.

2. The method of claim 1, wherein the overlayer is deposited over and in contact with the grating structures by vaporizing a precursor with the plasma, wherein the overlayer is at least one of a photoresist layer, an encapsulating layer, or a deposition layer.

3. The method of claim 2, further comprising removing a portion of the overlayer using a plasma formed at atmospheric pressure in the head of the applicator.

4. The method of claim 1, wherein changing the depth of the plurality of grating structures comprises sloping the plurality of grating structures in a direction from a first end of the substrate to a second end of the substrate.

5. The method of claim 4, wherein a refractive index of the waveguide structure changes linearly from the first end to the second end with respect to the depth of the plurality of grating structures.

6. The method of claim 4, wherein a refractive index of the waveguide structure changes non-linearly from the first end to the second end with respect to the depth of the plurality of grating structures.

7. The method of claim 4, wherein a refractive index of the waveguide structure oscillates from the first end to the second end with respect to the depth of the plurality of grating structures.

8. The method of claim 1, further comprising:
   creating a second surface profile by moving the head of the applicator relative to the plurality of grating structures; and
   removing grating material from the plurality of grating structures, based upon data representing a target profile.

9. The method of claim 2, wherein the surface profile of the overlayer is varied by varying at least one of a plasma power, a distance from the head of the applicator to a surface of the substrate, or a relative speed between the head and the surface of the substrate.

10. The method of claim 1, further comprising:
    creating a second surface profile by moving the head of the applicator relative to the plurality of grating structures; and
    depositing material over the grating structures, based upon data representing a target profile.

11. A method of forming a waveguide structure, comprising:
    expelling plasma from an applicator having a head toward a plurality of grating structures formed on a substrate, the plasma formed at atmospheric pressure in the head;
    depositing a layer over the plurality of grating structures by vaporizing a precursor with the plasma formed in the head;
    removing portions of the layer using a plasma from the applicator at atmospheric pressure to form a surface profile of the layer; and
    etching the plurality of grating structures through the layer.

12. The method of claim 11, wherein the surface profile of the layer is varied by varying at least one of a plasma power, a distance from the head of the applicator to a surface of the substrate, or a relative speed between the head and the surface of the substrate.

13. The method of claim 12, wherein the layer is formed from the precursor selected from a group containing one or more of ($N_2$), nitrogen dioxide ($NO_2$), fluorine gas ($F_2$), oxygen gas ($O_2$), hydrogen gas ($H_2$), $H_2O$ in vapor form, carbon monoxide (CO), methane ($CH_4$), carbon dioxide ($CO_2$), argon (Ar), and helium (He).

14. The method of claim 11, wherein the surface profile of the layer is varied by varying at least one of a plasma power, a distance from the head of the applicator to a surface of the substrate, or a relative speed between the head and the surface of the substrate.

15. A method of forming a waveguide structure, comprising:
    expelling plasma from an applicator having a head toward a substrate, the plasma formed at atmospheric pressure in the head;
    depositing one or more refractive layers over the substrate by vaporizing a precursor with the plasma formed in the head;
    depositing an overlayer on the one or more refractive layers; and
    forming a refractive grating structure by etching the one or more refractive layers through the overlayer.

16. The method of claim 15, further comprising:
    forming a plurality of gratings and a plurality of channels of the refractive grating structure by etching the channels in the one or more refractive layers.

17. The method of claim 15, wherein the precursor is selected from a group containing one or more of ($N_2$), nitrogen dioxide ($NO_2$), fluorine gas ($F_2$), oxygen gas ($O_2$), hydrogen gas ($H_2$), $H_2O$ in vapor form, carbon monoxide (CO), methane ($CH_4$), carbon dioxide ($CO_2$), argon (Ar), and helium (He).

18. The method of claim 16, wherein a change in depth of the plurality of gratings has a surface profile with a slope surface angle that changes linearly from a first end to a second end of the refractive grating structure.

19. The method of claim 15, further comprising:
forming a plurality of gratings and a plurality of channels of the refractive grating structure by etching the channels in the one or more refractive layers, wherein the plurality of gratings are formed at an angle between 5 degrees and 65 degrees with respect to the substrate.

20. The method of claim 9, wherein the head includes a nozzle having one or more openings.

21. The method of claim 1, wherein the surface angle includes a non-linear gradation.

22. A method of forming a waveguide structure, comprising:
expelling plasma from an applicator having a head toward a plurality of grating structures formed on a substrate, the plasma formed at atmospheric pressure in the head;
depositing a layer over the plurality of grating structures by vaporizing a precursor with the plasma formed in the head; and
removing portions of the layer using a plasma from the applicator at atmospheric pressure to form a surface profile of the layer, the surface profile having a surface angle.

23. The method of claim 22, wherein the surface profile of the layer is varied by varying at least one of a plasma power, a distance from the head of the applicator to a surface of the substrate, or a relative speed between the head and the surface of the substrate.

24. The method of claim 22, wherein the layer is formed from the precursor selected from a group containing one or more of ($N_2$), nitrogen dioxide ($NO_2$), fluorine gas ($F_2$), oxygen gas ($O_2$), hydrogen gas ($H_2$), $H_2O$ in vapor form, carbon monoxide (CO), methane ($CH_4$), carbon dioxide ($CO_2$), argon (Ar), and helium (He).

25. The method of claim 24, wherein the surface profile of the layer is varied by varying at least one of a plasma power, a distance from the head of the applicator to a surface of the substrate, or a relative speed between the head and the surface of the substrate.

* * * * *